(12) United States Patent
Hashino et al.

(10) Patent No.: US 8,955,997 B2
(45) Date of Patent: Feb. 17, 2015

(54) DISPLAY DEVICE, ILLUMINATING DEVICE AND HOUSING

(75) Inventors: Naruo Hashino, Tottori (JP); Kazunori Mori, Tottori (JP)

(73) Assignee: Sony Corporation, Tokyo (JP)

( * ) Notice: Subject to any disclaimer, the term of this patent is extended or adjusted under 35 U.S.C. 154(b) by 348 days.

(21) Appl. No.: 13/278,398

(22) Filed: Oct. 21, 2011

(65) Prior Publication Data

US 2012/0230016 A1    Sep. 13, 2012

(30) Foreign Application Priority Data

Oct. 29, 2010    (JP) ................. P2010-244319

(51) Int. Cl.

| | | |
|---|---|---|
| G09F 13/04 | (2006.01) | |
| F21V 7/04 | (2006.01) | |
| G02F 1/1335 | (2006.01) | |
| G02F 1/1333 | (2006.01) | |
| F21V 8/00 | (2006.01) | |

(52) U.S. Cl.
CPC .... *G02F 1/133611* (2013.01); *G02F 1/133308* (2013.01); *G02B 6/0088* (2013.01); *G02F 1/133603* (2013.01); *G02F 1/133604* (2013.01); *G02F 1/133608* (2013.01); *G02F 1/133615* (2013.01); *G02F 2001/133311* (2013.01); *G02F 2001/133317* (2013.01); *G02F 2001/133325* (2013.01); *G02F 2201/503* (2013.01); *G02F 2202/28* (2013.01)
USPC .......................................... 362/97.1; 362/634

(58) Field of Classification Search
CPC ................... G02F 1/133308; G02F 1/133608; G02B 6/0088
USPC .................... 362/97.1–97.4; 349/58
See application file for complete search history.

(56) References Cited

U.S. PATENT DOCUMENTS

| 6,305,812 | B1* | 10/2001 | Kim et al. ...................... 362/632 |
|---|---|---|---|
| 7,182,500 | B2* | 2/2007 | Sugawara ..................... 362/634 |
| 8,264,634 | B2* | 9/2012 | Cho ................................ 349/58 |
| 8,633,405 | B2* | 1/2014 | Shin et al. ..................... 174/535 |
| 2004/0004680 | A1* | 1/2004 | Kim ................................ 349/58 |
| 2007/0115692 | A1* | 5/2007 | Yao ................................ 362/632 |
| 2008/0111938 | A1* | 5/2008 | Park et al. ....................... 349/58 |
| 2011/0188263 | A1* | 8/2011 | Cho et al. ..................... 362/606 |
| 2011/0292317 | A1* | 12/2011 | Kim et al. ....................... 349/61 |

FOREIGN PATENT DOCUMENTS

| JP | 11-282360 A | 10/1999 |
|---|---|---|
| JP | 2003-157015 A | 5/2003 |
| JP | 2005-321614 A | 11/2005 |

(Continued)

*Primary Examiner* — David J Makiya
(74) *Attorney, Agent, or Firm* — Wolf, Greenfield & Sacks, P.C.

(57) ABSTRACT

Disclosed herein is a display device including: a display panel; an illuminating device adapted to illuminate the display panel from behind; an adhesive layer adapted to be disposed between the display panel and the illuminating device and bond together respective outer edges of the display panel and the illuminating device. The illuminating device includes a light source, and a housing adapted to house the light source. The housing includes a bottom plate portion, an annular upper plate portion installed at a position facing the bottom plate portion via a given gap and having a recessed-projected surface at a position in contact with the adhesive layer, and a wall portion provided upright along respective circumferential edges of the bottom plate portion and the upper plate portion.

17 Claims, 15 Drawing Sheets

(56) References Cited

FOREIGN PATENT DOCUMENTS

| JP | 2006-054177 A | 2/2006 |
| JP | 2006-106417 A | 4/2006 |
| JP | 2007-003570 A | 1/2007 |
| JP | 2010-096801 A | 4/2010 |
| JP | 2010-177074 A | 8/2010 |

* cited by examiner

DISPLAY DEVICE, ILLUMINATING DEVICE AND HOUSING

BACKGROUND

The present disclosure relates generally to a display device and an illuminating device that are configured to house a light source in a housing, and a housing that houses a light source. In particular, the disclosure relates to a display device, an illuminating device and a housing that are preferably mounted on a movable body such as an automobile or the like.

Electric devices mounted on a movable body such as an automobile or the like are such that constituting parts are generally secured to each other with adhesive members in order to prevent the constituent parts from oscillating or being damaged due to vibrations resulting from the traveling of the movable body. For example, an on-board display is such that a double-faced tape is provided between an electro-optical panel such as a liquid crystal display panel and a backlight to secure them together (see Japanese Patent Laid-open No. 2010-177074). The double-faced tape plays a role of not only securing the electro-optical panel and the backlight together but also preventing dust from entering therebetween.

SUMMARY

Incidentally, the above-mentioned on-board display may be such that a portion (a secured surface), of the upper surface of the backlight, to which the liquid display panel is secured is not a complete flat surface, i.e., is slightly slant or undulant in some cases. This may occur due to e.g. a manufacturing error caused during the process of manufacturing a housing for the backlight or to thermal history during use. If the flatness of the fixed surface is non-uniform as described above, then stress is applied to the liquid crystal panel secured to the backlight with the double-faced tape. Consequently, this leads to a problem of the occurrence of uneven brightness.

It is desirable to provide a display device, an illuminating device and a housing that can reduce uneven brightness due to stress.

According to an embodiment of the present disclosure, there is provided a display device including a display panel, an illuminating device adapted to illuminate the display panel from behind, and an adhesive layer adapted to be disposed between the display panel and the illuminating device and bond together respective outer edges of the display panel and the illuminating device. The illuminating device may include a light source and a housing adapted to house the light source. The housing may include a bottom plate portion, an annular upper plate portion installed at a position facing the bottom plate portion via a given gap and having a recessed-projected surface at a position in contact with the adhesive layer, and a wall portion provided upright along respective circumferential edges of the bottom plate portion and the upper plate portion.

According to another embodiment, there is provided a housing for housing a light source, including: a bottom plate portion; an annular upper plate portion provided at a position facing the bottom plate portion via a given gap and having a recessed-projected surface at a given position; and a wall portion provided upright along respective circumferential edges of the bottom plate portion and the upper plate portion.

According to further embodiment, there is provided an illuminating device including: a light source; and a housing adapted to house the light source. The housing may include a bottom plate portion, an annular upper plate portion provided at a position facing the bottom plate portion via a given gap and having a recessed-projected surface at a given position, and a wall portion provided upright along respective circumferential edges of the bottom plate portion and the upper plate portion.

The display device, illuminating device and housing of the present disclosure are each such that the upper plate portion of the housing that houses the light source are provided with the recessed-projected surface at the given position. In this way, when the display panel is secured onto the recessed-projected surface via the adhesive layer, gaps are defined between portions, of the adhesive layer, other than immediately above the projections included in the recessed-projected surface and the display panel. As a result, while minimizing reduction of the force of securing the liquid crystal panel to the housing, it can easily be enabled to locally peel the adhesive layer.

The display device, illuminating device and housing of the present disclosure can enable the adhesive layer to be locally peeled while minimizing reduction of the force of securing the display panel to the housing. For example, the display panel is secured onto the housing via the adhesive layer. In such a case, if the flatness of the housing is non-uniform, therefore, the adhesive layer peels at a position where the flatness of the housing is non-uniform, thereby reducing stress occurring in the display panel. Thus, uneven brightness due to stress can be reduced.

DETAILED DESCRIPTION OF THE PREFERRED EMBODIMENTS

Preferred embodiments of the present disclosure will be described in detail with reference to the drawings. Incidentally, the description is given in the following order.
1. Embodiment
An example in which an upper plate portion of a housing is formed with a recessed-projected surface at four sides
2. Modified Examples
Variations of the layout and shape of the recessed-projected surface
<1. Embodiment>
[Configuration]

Figure 1:
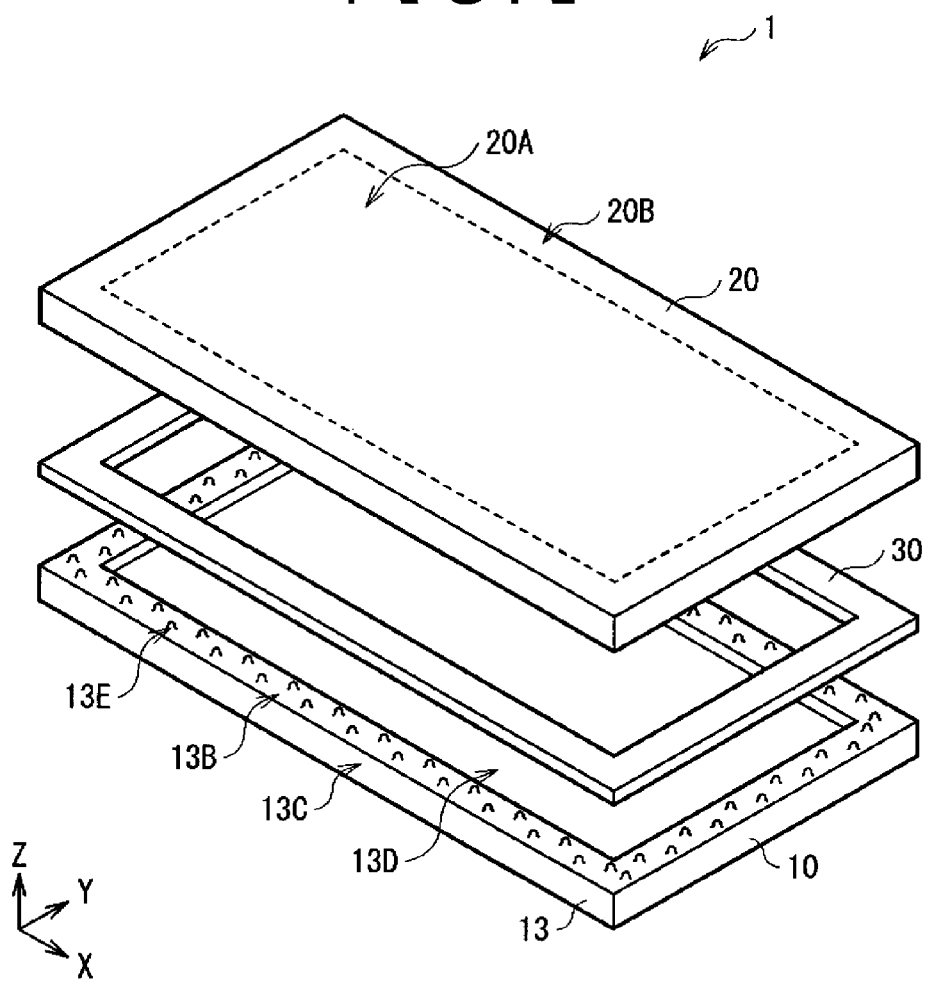
FIG. 1 is an exploded perspective view illustrating one example of the configuration of a display device according to an embodiment of the present disclosure.

A description is first given of a display device 1 according to an embodiment of the present disclosure. FIG. 1 is an exploded perspective view illustrating an example of a schematic configuration of the display device 1. The display device 1 includes a liquid crystal panel 20; a backlight 10 disposed behind the liquid crystal panel 20;

an adhesive layer 30 disposed between the liquid crystal panel 20 and the backlight 10; and a drive circuit (not shown) for driving the liquid crystal panel 20. Incidentally, the liquid crystal panel 20 corresponds to a specific example of "the display panel" of the present disclosure. The backlight 10 corresponds to a specific example of "the illuminating device" of the present disclosure. The inner configuration of the display device 1 is hereinafter described in order of the liquid crystal panel 20, the adhesive layer 30 and the backlight 10.
(Liquid Crystal Panel 20)

The liquid crystal panel 20 is adapted to display images and is formed, e.g., in a rectangular shape with four sides as shown in FIG. 1. The liquid crystal panel 20 is e.g. a transmissive display panel in which pixels are driven in response to image signals and is configured such that a liquid crystal layer is put between a pair of transparent substrates. An area in which the pixels are arranged, in the liquid crystal panel 20 is a video display area 20A. An external edge (specifically, a circumferential edge of the video display area 20A) of the liquid crystal panel 20 is a frame area 20B, which is a video non-display area. Although not illustrated, the liquid crystal panel 20 includes e.g. a polarization element, a transparent substrate, a pixel electrode, an oriented film, a liquid crystal layer, an oriented film, a common electrode, a color filter, a transparent substrate and a polarization element in order from the backlight 10 side.

The transparent substrate is composed of a substrate transmitting visible light, e.g. plate glass. Incidentally, an active type drive circuit including thin film transistors (TFT) electrically connected to pixel electrodes, wiring, etc. is formed on the transparent substrate on the backlight 10 side. The pixel electrode and the common electrode are each made of e.g. indium tin oxide (ITO). The pixel electrodes are arranged in a lattice pattern on e.g. the transparent substrate and each function as an electrode for each corresponding pixel. On the other hand, the common electrodes are formed all over e.g. the color filter and each function as a common electrode opposed to a corresponding pixel electrode. The oriented film is made of a polymer material such as e.g. polyimide or the like and has a function of orienting a liquid crystal. The liquid crystal layer is composed of liquid crystals having e.g. a VA (Vertical Alignment) mode, a TN (Twisted Nematic) mode or an STN (Super Twisted Nematic) mode. In addition, the liquid crystal layer has a function in which the orientation of the polarized axis of light emitted from the backlight 10 is changed for each pixel by voltage applied from the drive circuit (not shown). Incidentally, the orientation of the transparent axis of each pixel is adjusted in a multi-step manner by changing the arrangement of the liquid crystals in a multi-step manner. The color filter is adapted to separate light having passed through the liquid layer into three primary colors, e.g. red (R), green (G) and blue (B) or into four colors, e.g. R, G, B and white (W). In addition, the color filters are arranged to correspond to the arrangement of the pixel electrodes.

The polarization element is one of optical shutters and is adapted to transmit light (polarized light) with a fixed vibration direction. Incidentally, the polarization element may be an absorption type polarization element, which absorbs light (polarized light) with vibration directions other than a transmissive axis. However, the polarization element may preferably be a reflection type polarization element reflecting light toward the backlight 10 side in view of improvement in brightness. The polarization elements are arranged so that their polarization axes are different from each other by 90 degrees. With this, the light emitted from the backlight 10 passes through via the crystal liquid layer or is interrupted.
(Adhesive Layer 30)

Figure 2:
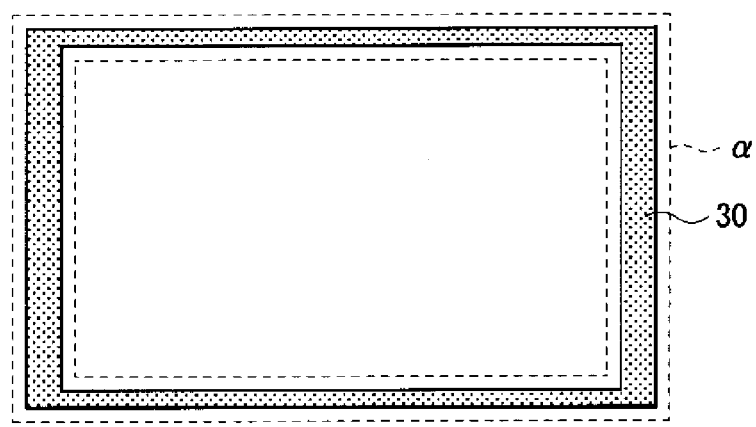
FIG. 2 is a plan view illustrating one example of the configuration of an adhesive layer in FIG. 1.
Figure 3:
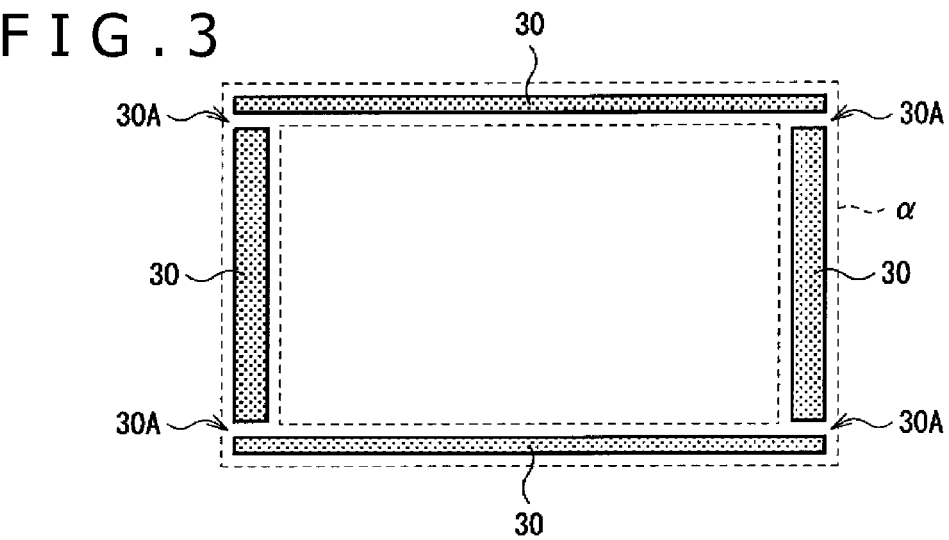
FIG. 3 is a plan view illustrating another example of the configuration of the adhesive layer in FIG. 1.

The adhesive layer 30 is disposed in an area αopposed to the frame area 20B of the liquid crystal panel 20 as shown in e.g. FIG. 2. The liquid crystal panel 20 is formed in a rectangular shape having four sides as shown in FIG. 1. In such a case, the adhesive layer 30 is formed in rectangular shape as shown in e.g. FIG. 2. In addition, the adhesive layer 30 is formed in an annular shape having an opening corresponding to the video display area 20A. Incidentally, the adhesive layer 30 may individually be provided for each of the sides of the frame area 20B as shown in e.g. FIG. 3. If the adhesive layer 30 is individually provided for each of the sides of the frame area 20B, it is shaped like a band and is disposed to have a slight gap 30A between the adhesive layer and another adhesive layer 30, as shown in FIG. 3.

The adhesive layer 30 is disposed in an area α opposed to the frame area 20B of the liquid crystal panel 20 as shown in e.g. FIG. 2. The liquid crystal panel 20 is formed in a rectangular shape having four sides as shown in FIG. 1. In such a case, the adhesive layer 30 is formed in rectangular shape as shown in FIG. 2. In addition, the adhesive layer 30 is formed in an annular shape having an opening corresponding to the video display area 20A. Incidentally, the adhesive layer 30 may individually be provided for each of the sides of the frame area 20B as shown in e.g. FIG. 3. If the adhesive layer 30 is individually provided for each of the sides of the frame area 20B, it is shaped like a band and is disposed to have a slight gap 30 between the adhesive layer and another adhesive layer 30, as shown in FIG. 3.

(Backlight 10)

Figure 4A:
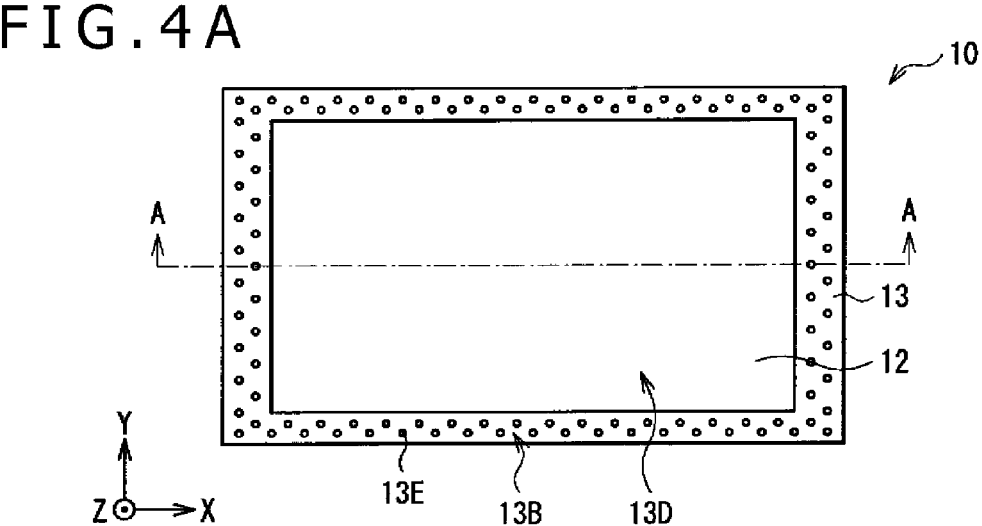
FIG. 4A is a plan view illustrating one example of the configuration of a backlight in FIG. 1.
Figure 4B:
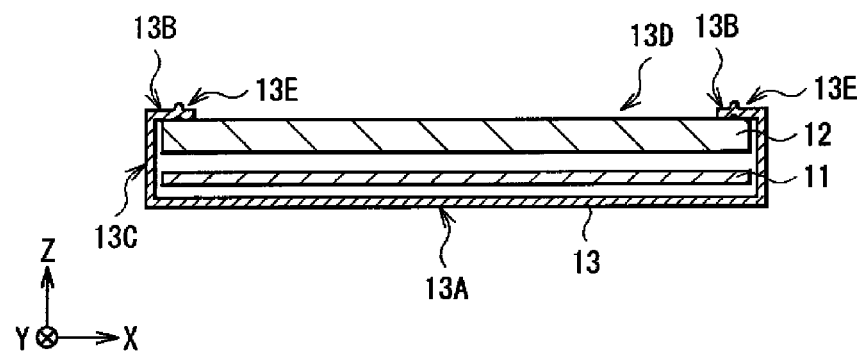
FIG. 4B is a cross-sectional view illustrating one example of the configuration of the backlight in FIG. 1.

FIG. 4A illustrates one example of a planar configuration of the backlight 10. FIG. 4B illustrates one example of a sectional configuration of the backlight 10 in a direction of arrow A-A in FIG. 4A. The backlight 10 is adapted to illuminate the liquid crystal panel 20 from the back. In addition, the backlight 10 is composed of a light source 11, an optical member 12 and the housing 13 which houses the light source 11 and the optical member 12.

A light source 11 is e.g. a just-below type light source, e.g., a surface-emitting light source arranged over all the bottom of the housing 13. The surface-emitting light source has a plurality of linear light sources arranged at given pitches. Examples of the liner light source include a hot cathode fluorescent lamp (HCFL) and a cold cathode fluorescent lamp (CCFL). The surface-emitting light source may be such that e.g. a plurality of point-like light sources are arranged in a matrix at given pitches. Examples of the point-like light sources include a light emitting diode (LED) and a laser diode (LD). The surface-emitting light source may be configured to include electro luminescence elements. The optical member 12 is adapted to equalize the in-plane brightness of light emitted from the light source 11. Although not shown, the optical member 12 is formed by stacking optical elements, such as e.g. diffuser panels, diffuser plates or prism sheets. For example, the optical member 12 is disposed immediately above the light source 11.

Figure 5:
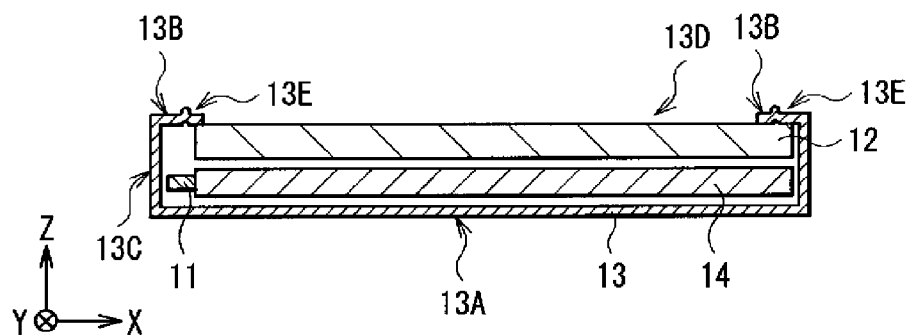
FIG. 5 is a cross-sectional view illustrating another example of the configuration of the backlight in FIG. 1.

Incidentally, the light source 11 may be an edge light type light source. In this case, the backlight 10 may be further provided with a light guide plate 14 as shown in FIG. 5. FIG. 5 illustrates one example of a sectional configuration at a position corresponding to line A-A in FIG. 4A. In this case, the light source 11 is disposed on a lateral surface of the light guide plate 14 to illuminate the lateral surface of the light guide plate 14. Therefore, in this case, the light source 11 is composed of e.g. linear light sources or of a plurality of point-like light sources arranged in a linear manner. Incidentally, this case can omit the optical member 12 as necessary.

The housing 13 is used to house at least the light source 11. The housing 13 is designed to house the light source 11 and the optical member 12 as shown in e.g. FIG. 4B. Incidentally, as shown in FIG. 5, for example, the housing 13 may be designed to house the light guide plate 14, the light source 11 disposed on the lateral surface of the light guide plate 14, and the optical member 12 disposed immediately above the light guide plate 14.

The housing 13 is formed of e.g. a conductive material. Examples of the conductive material include iron and an aluminum alloy. If being formed of the conductive material, the housing 13 functions as not only a protection container that protects the light source 11, the optical member 12 and the like from a shock or dust from the outside but also a heat sink that dissipates heat produced by the light source 11. Incidentally, the housing 13 may be formed of a non-conductive material, e.g., a resin material such as polycarbonate.

The housing 13 is formed like a box. If the liquid crystal panel 20 is formed in a rectangular shape having four sides shown in FIG. 1, the housing 13 is shaped in a rectangular parallelepiped as shown in e.g. FIGS. 4A, 4B and 5. As shown in e.g. FIGS. 4B and 5, the housing 13 includes a bottom plate portion 13A; an upper plate portion 13B installed at a position facing the bottom plate portion 13A with a given gap defined therebetween; and a wall portion 13C provided to erect along the circumferential edges of the bottom plate portion 13A and of the upper plate portion 13B.

The bottom plate portion 13A is formed like a plate. If the liquid crystal panel 20 is formed in a rectangular shape having four sides as shown in FIG. 1, the bottom plate portion 13A is formed, for example, in a rectangular shape having four sides. Also the upper plate portion 13B is formed like a plate. If the liquid crystal panel 20 is formed in a rectangular shape having four sides as shown in FIG. 1, the upper plate portion 13B is formed e.g. in a rectangular shape having four sides. In addition, the upper plate portion 13B has an annular shape having an opening 13D corresponding to the video display area 20A. As shown in e.g. FIG. 1, the upper plate portion 13B is disposed in an area not opposed to the video display area 20A of the liquid crystal panel 20, and is disposed, for example, in an area (an area corresponding to the above-mentioned area α) opposed to the frame area 20B of the liquid crystal panel 20.

Figure 6:
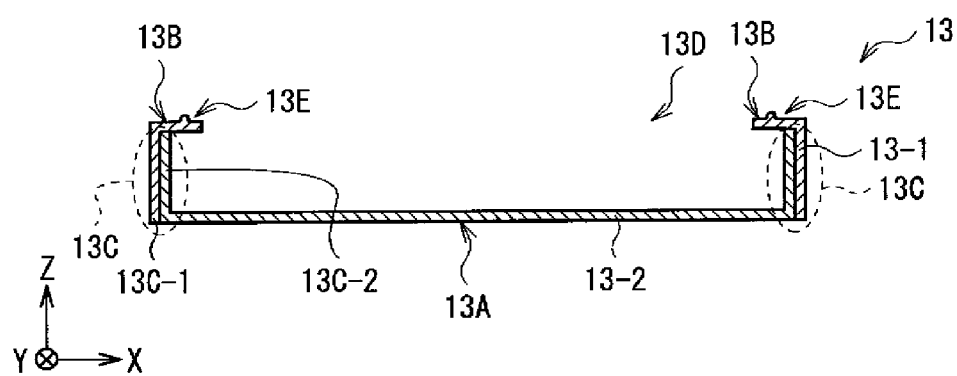
FIG. 6 is a cross-sectional view illustrating one example of the configuration of a housing in FIG. 1.

The housing 13 is actually formed by combining a lid body 13-1 on the upper plate portion 13B side with a base 13-2 on the bottom plate portion 13A side as shown in FIG. 6, for example. The lid body 13-1 is formed e.g. by sheet-metal working. Although not shown, the lid body 13-1 is formed, e.g., by cutting out an expanded plate from a single plate and bending the expanded plate. The lid body 13-1 is formed of e.g. an upper plate portion 13B and an upper plate lateral wall portion 13C-1. The upper plate lateral wall portion 13C-1 is e.g. a vertical wall portion perpendicular to the front surface of the upper plate portion 13B. On the other hand, the base 13-2 is formed e.g. by sheet-metal working similarly to the lid body 13-1. The base 13-2 is formed of e.g. a bottom plate portion 13A and a bottom plate lateral wall portion 13C-2. The bottom plate lateral wall portion 13C-2 is e.g. a vertical wall portion perpendicular to the front surface of the bottom plate portion 13A. The bottom plate lateral wall portion 13C-2 is brought into contact with the upper plate lateral wall portion 13C-1 when the lid body 13-1 and the base 13-2 are combined with each other for example. In addition, the lid body 13-1 and the base 13-2 are secured to each other through friction due to contact with the upper plate lateral wall portion 13C-1.

Figure 7:
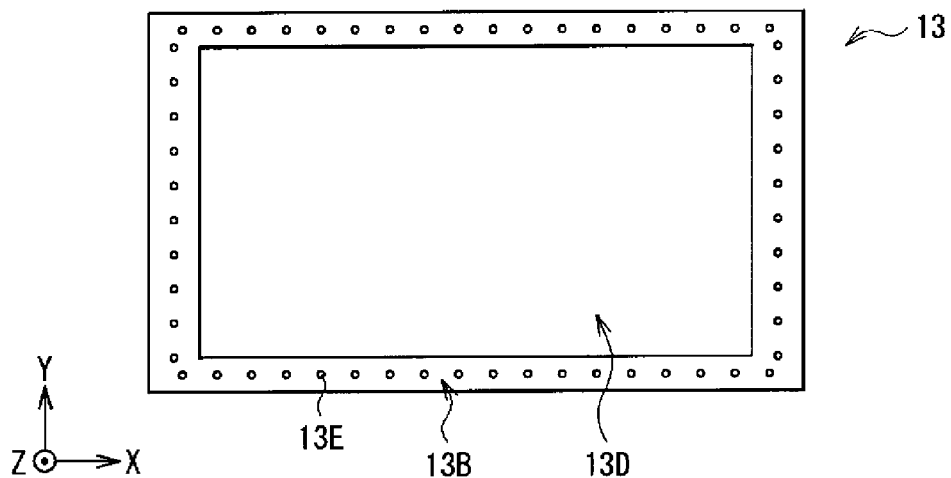
FIG. 7 is a plan view illustrating a first modified example of the layout of the projections in FIG. 1.
Figure 8:
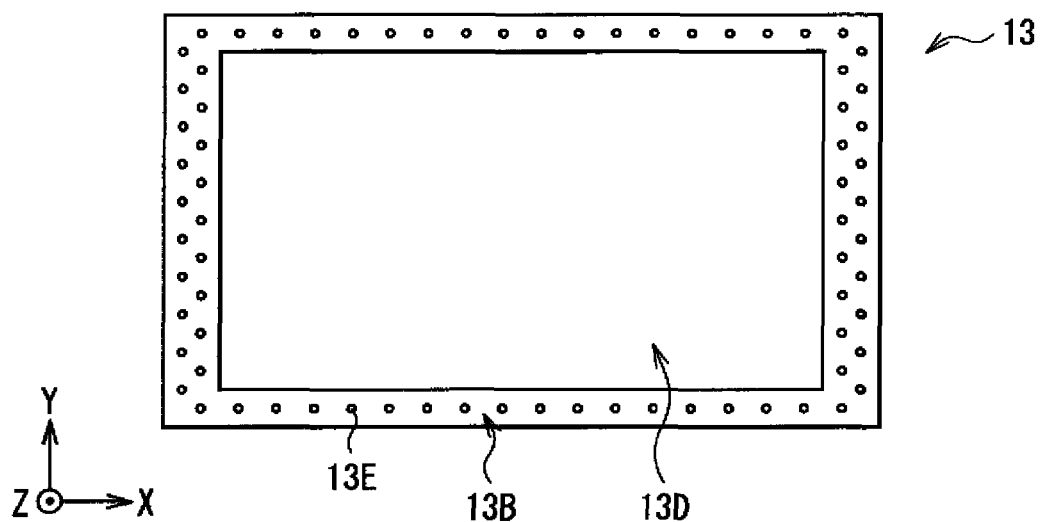
FIG. 8 is a plan view illustrating a second modified example of a layout of the projections in FIG. 1.

Incidentally, the upper plate portion 13B of the housing 13 has a recessed-projected surface at a position in contact with the adhesive layer 30. As shown in e.g. FIGS. 1, 4A and 4B, the recessed-projected surface has a front surface shape in which a plurality of projections 13E are formed on a flat surface with given gaps defined therebetween. Incidentally, the projection 13E corresponds to one specific example of "the first projection" of the present disclosure. The plurality of projections 13E may be arranged alternately (staggeringly, or in a zig-zag manner) along the extending direction of the upper plate portion 13B as shown in e.g. FIG. 4A. Alternatively, the projections may be arranged in line in an extending direction of the upper plate portion 13B as shown in FIG. 7. For example, the upper plate portion 13B may have sides with a wide width and with a narrow width. In such a case, as shown in e.g. FIG. 8, the plurality of projections 13E may be arranged alternately (staggeringly, or in a zig-zag manner) in the extending direction of the upper plate portion 13B in the sides with a wide width. In addition, the projections 13E may be arranged in line in the extending direction of the upper plate portion 13B in the sides with a narrow width. Intervals between the corresponding projections 13E may be equal to each other regardless of places, narrow or wide depending on places, or random regardless of places.

Figure 9:
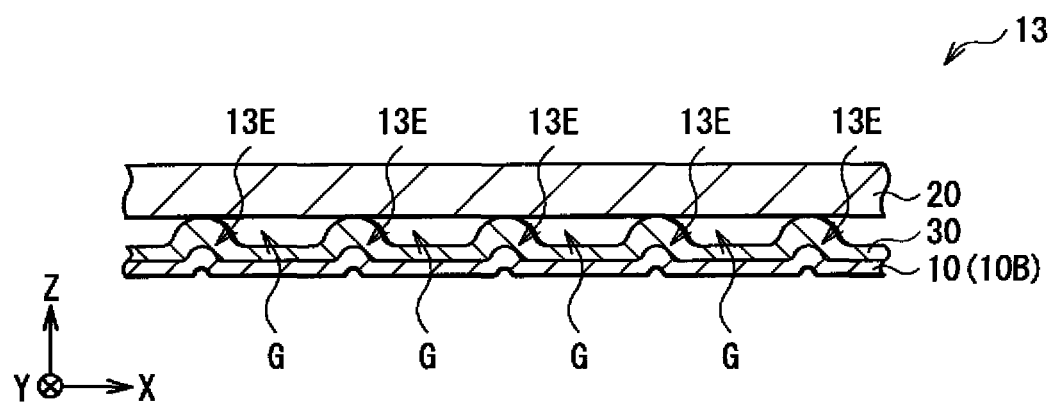
FIG. 9 is a cross-sectional view illustrating one example of gaps defined between the backlight and liquid crystal panel in FIG. 1.

Each projection 13E has such a cubic shape that a plate-like member and the projection 13E are in point-contact with each other when the plate-like member (not shown) is put on the front surface of the upper plate portion 13B. Each projection 13E has such a cubic shape that the adhesive layer 30 and the liquid crystal panel 20 are in point-contact with each other as shown in e.g. FIG. 9. In this case, the adhesive layer 30 is formed following the front surface shape of the recessed-projected surface of the upper plate portion 13B as described above. Therefore, gaps G are defined between portions, of the adhesive layer 30, other than immediately above the projections 13E and the liquid crystal panel 20. For example, the gap G has a height equal to the height of the projection 13. The gap G may be filled with air. Although not shown, the gap G may be filled with some substance softer than the adhesive layer 30, for example.

If the gaps G are filled with air, gaps existing between the backlight 10 and the liquid crystal panel 20 spatially communicates with the outside of the display device 1 via the corresponding gaps G. The plurality of projections 13E may be formed alternately along the extending direction of the upper plate portion 13B. In such a case, the intervals between the corresponding projections 13E are set appropriately. This can prevent a person from visually recognizing the gaps existing between the backlight 10 and the liquid crystal panel 20 via the corresponding gaps G when the person views the display device 1 from the lateral surface.

[Effects]

A description is next given of effects of the display device 1.

In the present embodiment, the recessed-projected surface is provided at a given position in the upper plate portion 13B of the housing 13 housing the light source 11 and the like. Specifically, the plurality of projections 13E are provided on the upper plate portion 13B of the housing 13 at positions in contact with the adhesive layer 30. In this way, when the liquid crystal panel 20 is secured onto e.g. the recessed-projected surface via the adhesive layer 30, the gaps G are defined between the portions, of the adhesive layer 30, other than immediately above the projections 13E included in the recessed-projected surface. As a result, while minimizing the force of securing the liquid crystal panel 20 to the housing 13, it can easily be enabled to locally peel the adhesive layer 30.

In the present embodiment, in particular, each projection 13E has such a cubic shape that the plate-like member and the projection 13E come into point-contact with each other when the plate-like member (not shown) is put on the front surface of the upper plate portion 13B. Further, each projection 13E has such a cubic shape that the adhesive layer 30 and the liquid crystal panel 20 come into point-contact with each other. Therefore, while minimizing the lowering of the force of securing the liquid crystal panel 20 to the housing 13, it can easily be realized to locally peel the adhesive layer 30.

As a result, when the liquid crystal panel 20 is secured to the housing 13 via the adhesive layer 30, if the flatness of the housing 13 is non-uniform, the adhesive layer 30 peels at a position where the flatness of the housing 13 is non-uniform, thereby reducing stress occurring in the liquid panel 20. Thus, uneven brightness due to stress can be reduced compared with the case where the liquid crystal panel 20 and the backlight 20 are firmly secured to each other via the adhesive layer 30.

In the present embodiment, if the plurality of projections 13E are formed alternately along the extending direction of the upper plate portion 13B, the intervals between the corresponding projections 13E are set appropriately. This can prevent a person from visually recognizing the gaps existing between the backlight 10 and the liquid crystal panel 20 via the corresponding gaps G when the person views the display device 1 from the lateral surface. In such a case, even if the gaps existing between the backlight 10 and the liquid crystal panel 20 spatially communicate with the outside of the display device 1 via the corresponding gaps G, it is possible to reliably prevent dust from entering the inside of the display device 1. In addition, in such a case, not only dust can be prevented from entering the inside of the display device 1 but also the air heated by the liquid crystal panel 20, the light source 11 and the like in the display device 1 can efficiently be released to the outside via the gaps G.

<2. Modified Examples>

The recessed-projected surface (the plurality of projections 13E) is formed all over the upper plate portion 13B in the present embodiment. However, the recessed-projected surface may partially be formed on the upper plate portion 13B. Specifically, if the upper plate portion 13B is formed in a rectangular shape with four sides, the recessed-projected surface (the plurality of projections 13E) may be formed on at least two sides opposite to each other among the four sides of the upper plate portion 13B. In this case, also the adhesive layer 30 may be formed only the sides, formed with the recessed-projected surface (the plurality of projections 13E), among the four sides of the upper plate portion 13B.

Figure 10:
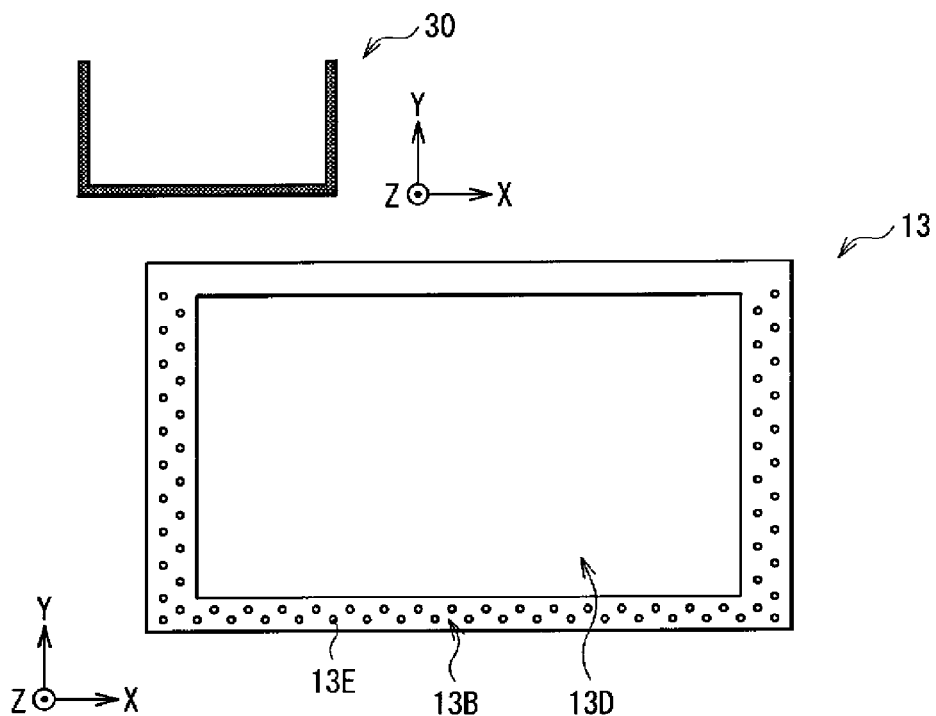
FIG. 10 is a plan view illustrating a third modified example of the layout of the projections in FIG. 1.
Figure 11:
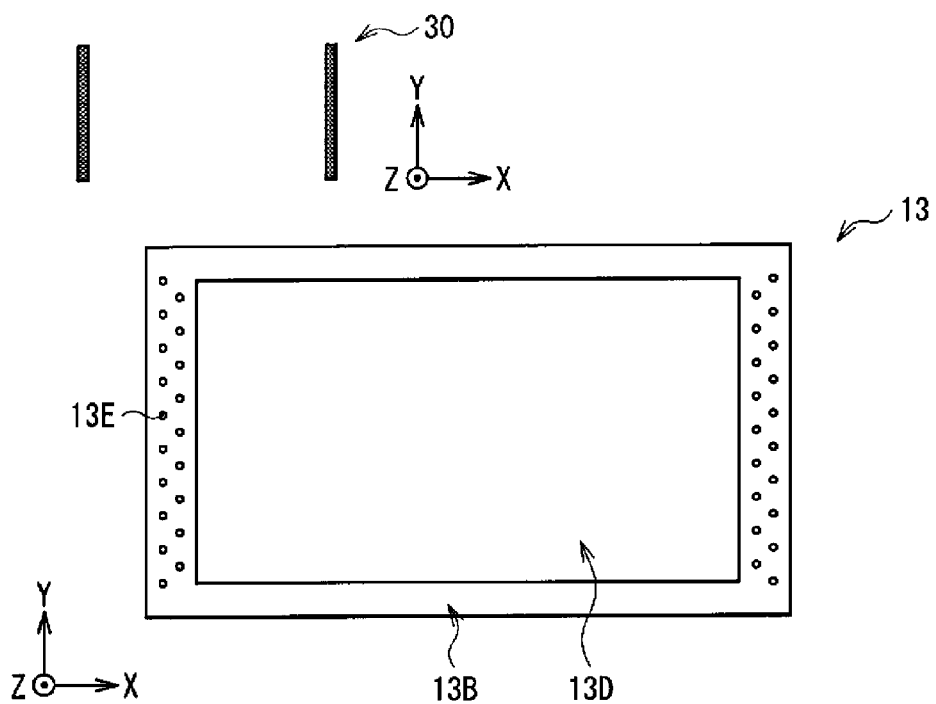
FIG. 11 is a plan view illustrating a fourth modified example of the layout of the projections in FIG. 1.
Figure 12:
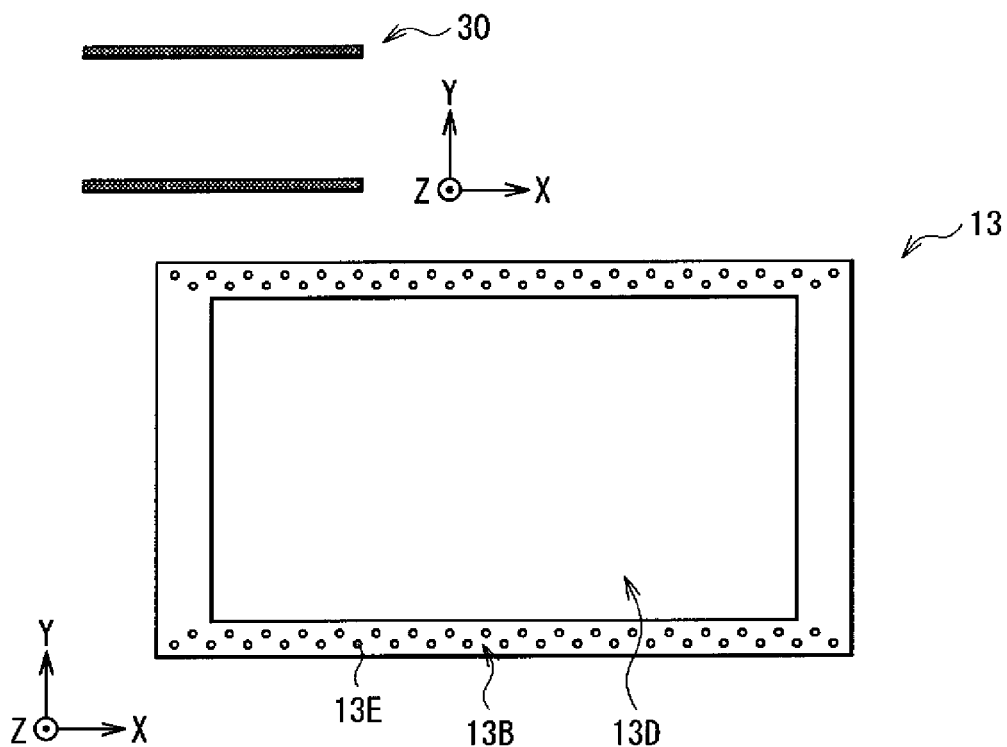
FIG. 12 is a plan view illustrating a fifth modified example of the layout of the projections in FIG. 1.

As shown in e.g. FIG. 10, the recessed-projected surface (the plurality of projections 13E) may be formed also on three sides among the four sides of the upper plate portion 13B. In this case, as shown in e.g. FIG. 10, also the adhesive layer 30 needs only to be formed on three sides formed with the recessed-projected surface among the four sides of the upper plate portion 13B. As shown in e.g. FIG. 11, the recessed-projected surface (the plurality of projections 13E) may be formed on two sides (specifically, two left and right sides) opposite to each other among the four sides of the upper plate portions 13B. As shown in e.g. FIG. 12, the recessed-projected surface (the plurality of projections 13E) may be formed on two sides (specifically, two upper and lower sides) opposite to each other among the four sides of the upper plate portion 13B. In these cases, as shown in e.g. FIGS. 11 and 12, also the adhesive layer 30 may be formed on the two sides formed with the recessed-projected surface (the plurality of projections 13E) among the four sides of the upper plate portion 13B.

In the present embodiment and the modified examples, each projection 13E has such a cubic shape that the plate-like member and the projection 13E come into point-contact with each other when the plate-like member is put on the front surface of the upper plate portion 13B. However, each projection 13E may have such a cubic shape that the plate-like member and the projection 13E come into linear contact with each other. Further, in the present embodiment and the modified examples, each projection 13E has such a cubic shape that the adhesive layer 30 and the liquid crystal panel 20 come into point-contact with each other. However, each projection 13E may have such a cubic shape that the adhesive layer 30 and the liquid crystal panel 20 come into linear contact with each other.

Figure 13:
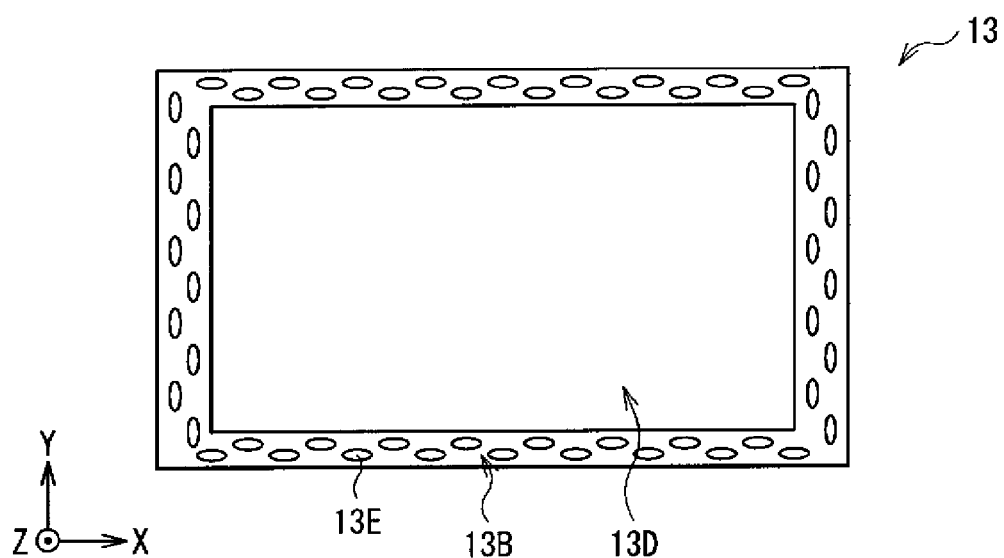
FIG. 13 is a plan view illustrating another example of a shape of the projection in FIG. 1.
Figure 14:
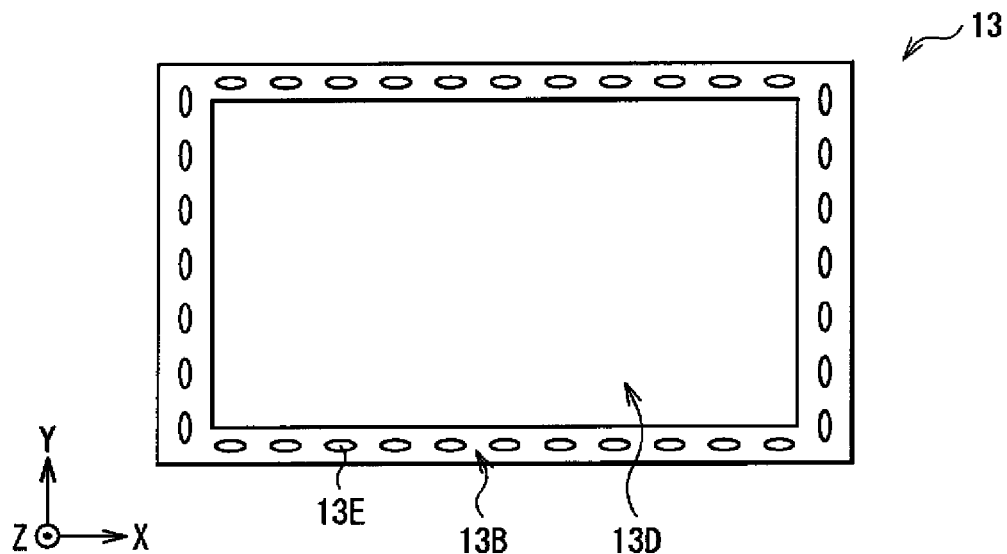
FIG. 14 is a plan view illustrating a first modified example of the layout of the projections in FIG. 13.
Figure 15:
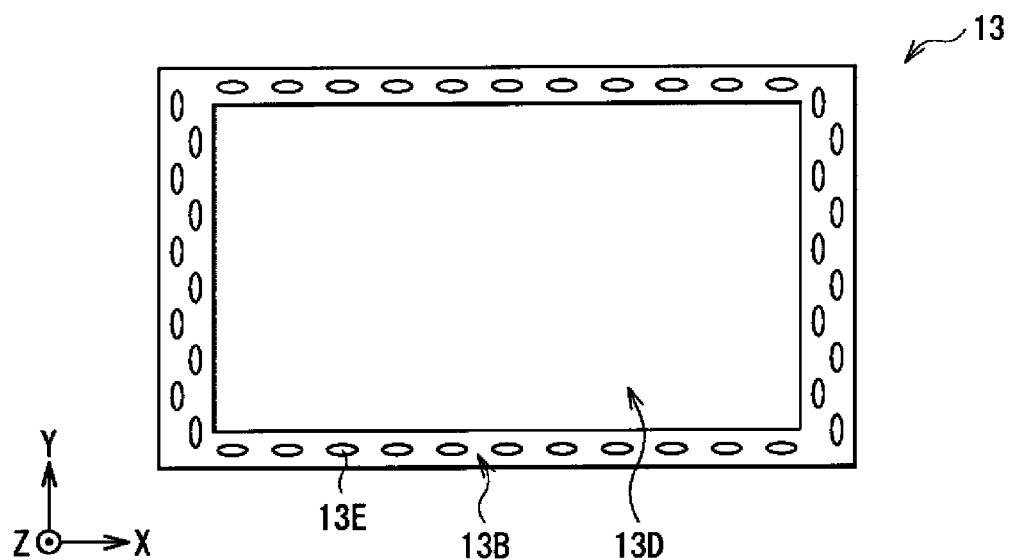
FIG. 15 is a plan view illustrating a second modified example of the layout of the projections in FIG. 13.
Figure 16:
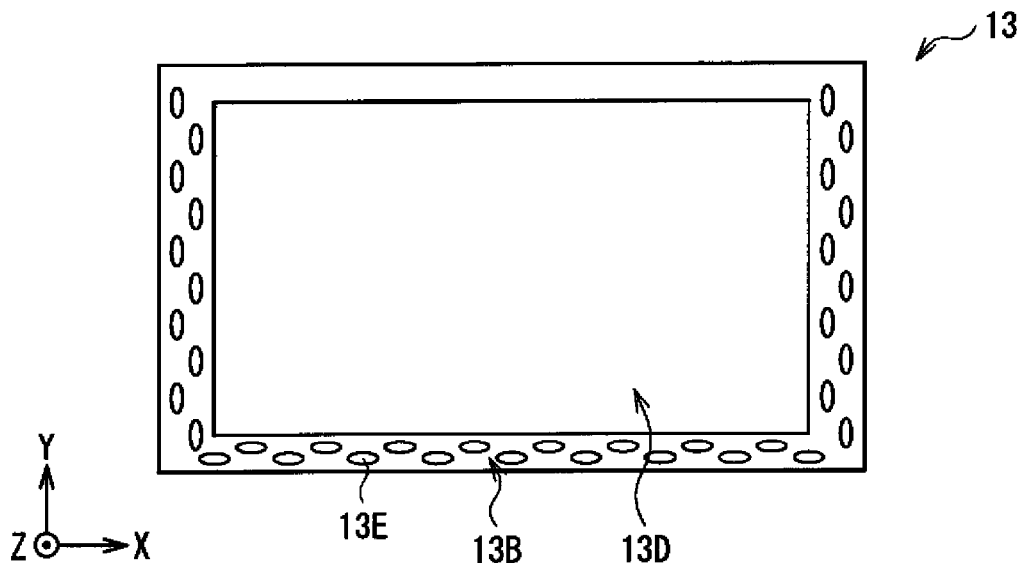
FIG. 16 is a plan view illustrating a third modified example of the layout of the projections in FIG. 13.
Figure 17:
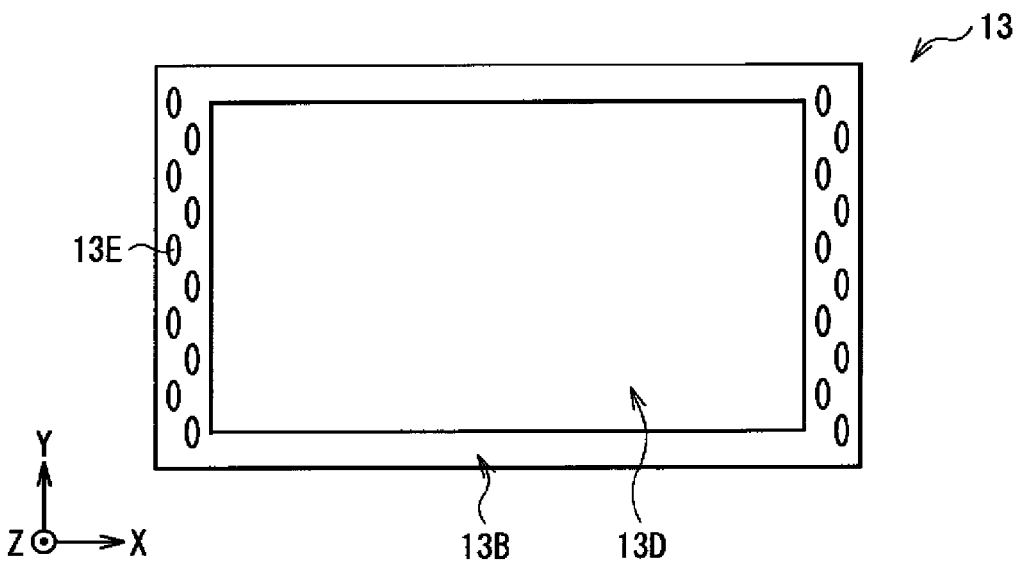
FIG. 17 is a plan view illustrating a fourth modified example of the layout of the projections in FIG. 13.
Figure 18:
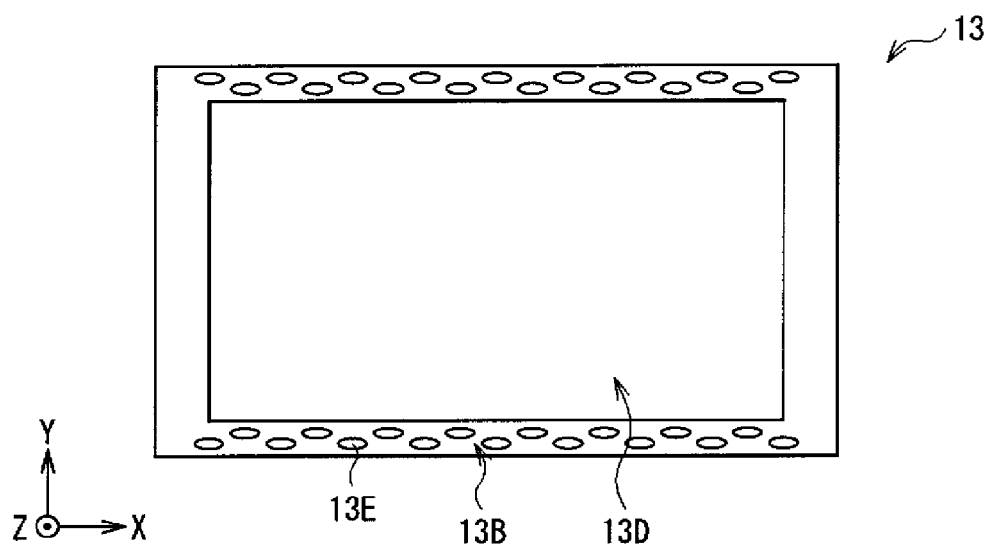
FIG. 18 is a plan view illustrating a fifth modified example of the layout of the projections in FIG. 13.

As shown in e.g. FIGS. 13 to 18, each projection 13E is shaped like a bar extending in an in-plane direction of the upper plate portion 13B. In addition, each projection 13E is formed in such a cubic shape that its top includes a linear ridge. Each projection 13E may extend in a direction parallel to the extending direction (a circumferential direction) of the upper plate portion 13B. Alternatively, each projection 13E may extend in a direction intersecting (or perpendicular to) the extending direction (a circumferential direction) of the upper plate portion 13B. Incidentally, FIG. 13 illustrates a modified example of the housing 13 depicted in FIG. 4A. FIG. 14 illustrates a modified example of the housing 13 depicted in FIG. 7. FIG. 15 illustrates a modified example of the housing 13 depicted in FIG. 8. FIG. 16 illustrates a modified example of the housing 13 depicted in FIG. 10. FIG. 17 illustrates a modified example of the housing 13 depicted in FIG. 11. FIG. 18 illustrates a modified example of the housing 13 depicted in FIG. 12.

Figure 19:
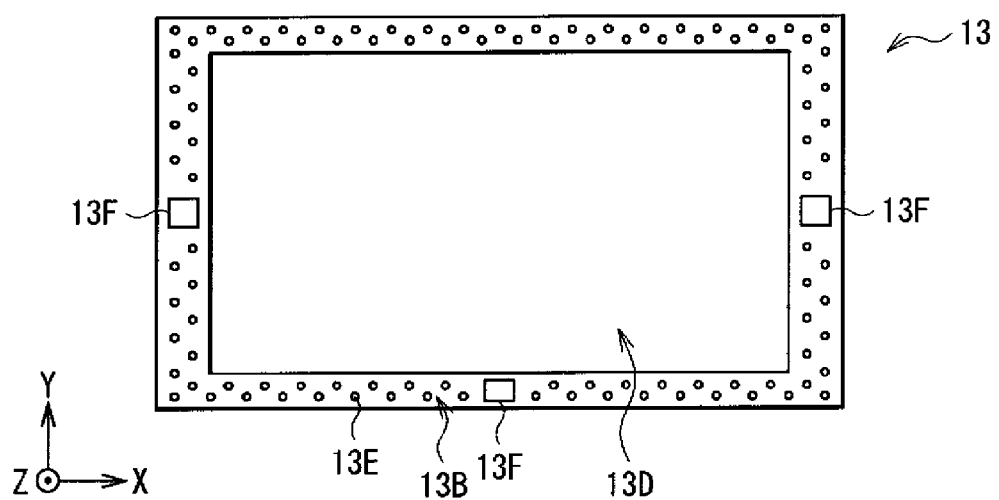
FIG. 19 is a plan view illustrating a modified example of the housing in FIG. 4.
Figure 20:
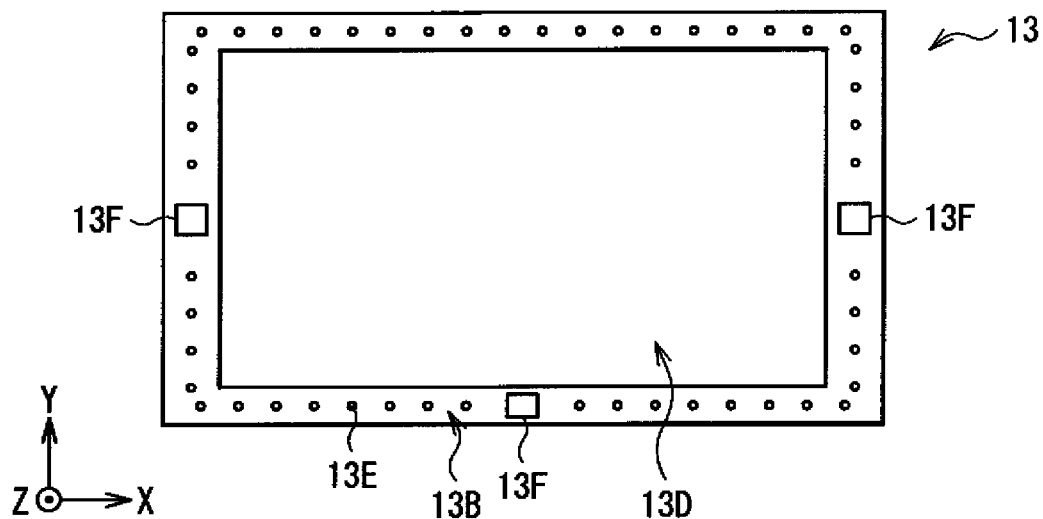
FIG. 20 is a plan view illustrating a modified example of the housing in FIG. 7.
Figure 21:
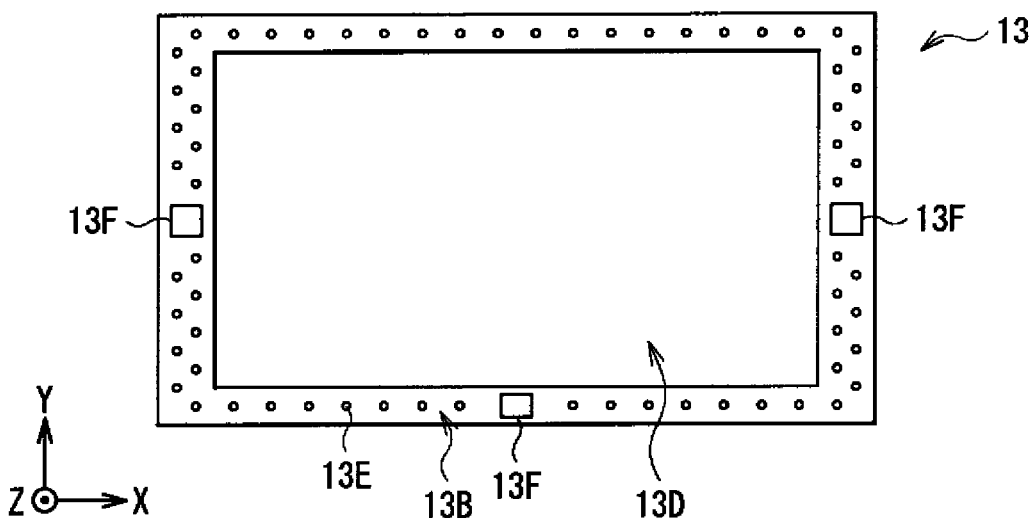
FIG. 21 is a plan view illustrating a modified example of the housing in FIG. 8.
Figure 22:
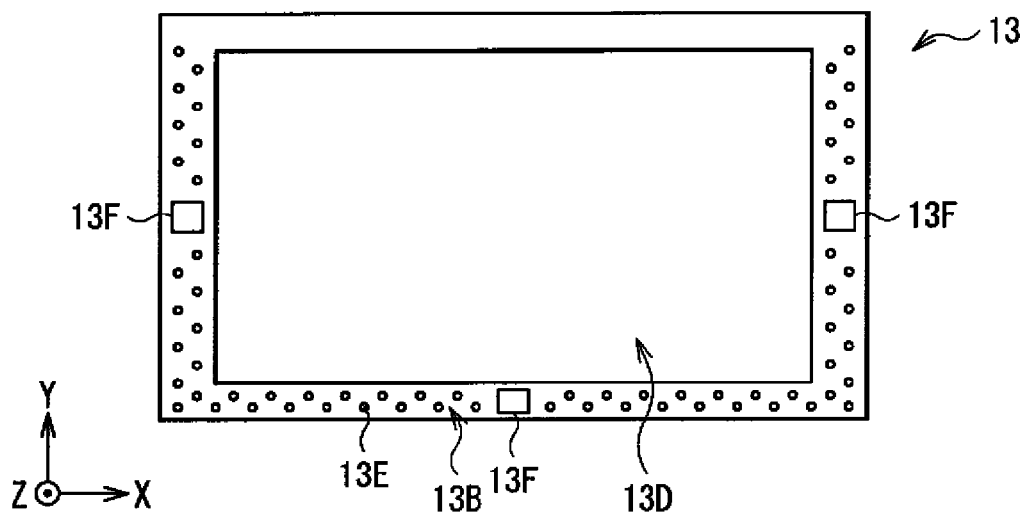
FIG. 22 is a plan view illustrating a modified example of the housing in FIG. 10.
Figure 23:
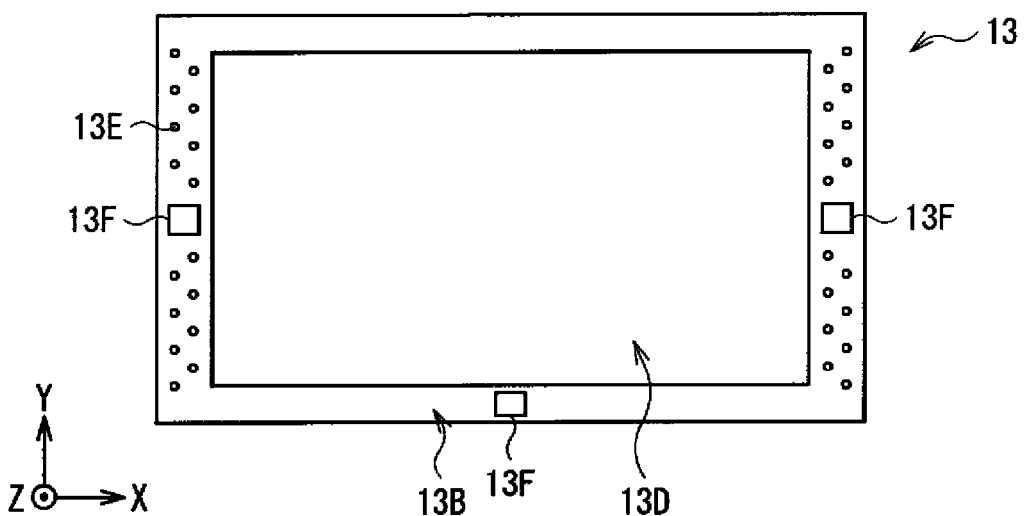
FIG. 23 is a plan view illustrating a modified example of the housing in FIG. 11.
Figure 24:
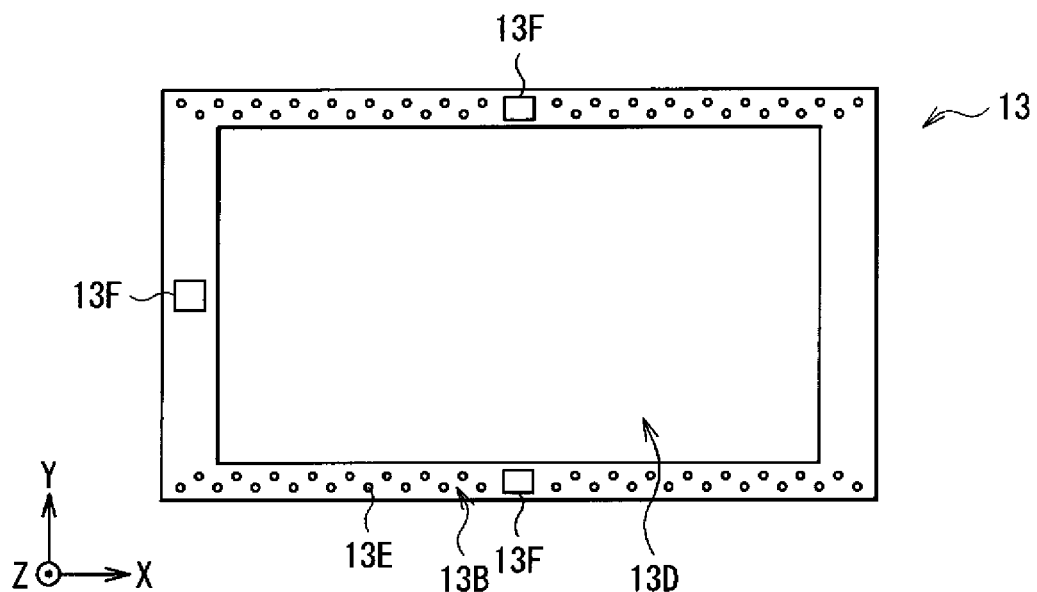
FIG. 24 is a plan view illustrating a modified example of the housing in FIG. 12.
Figure 25:
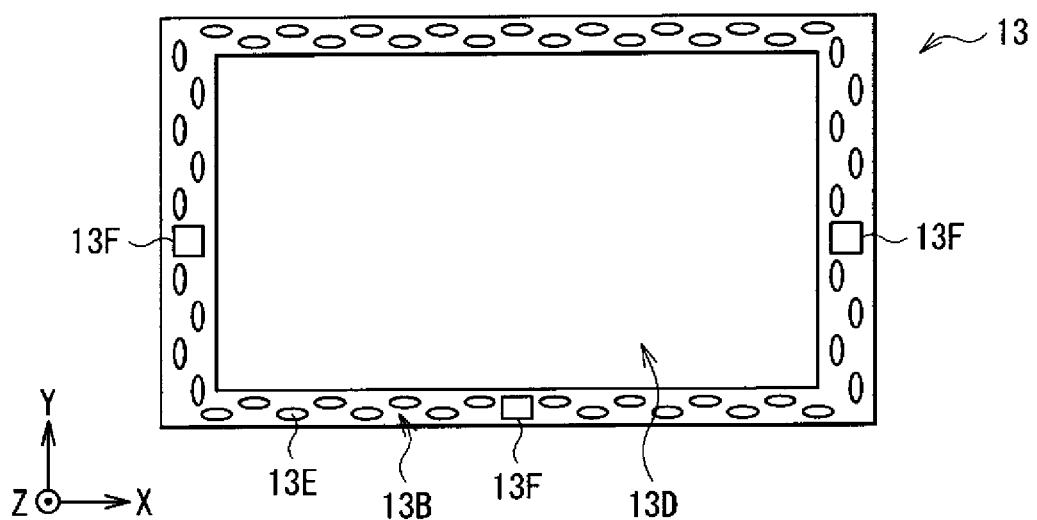
FIG. 25 is a plan view illustrating a modified example of the housing in FIG. 13.
Figure 26:
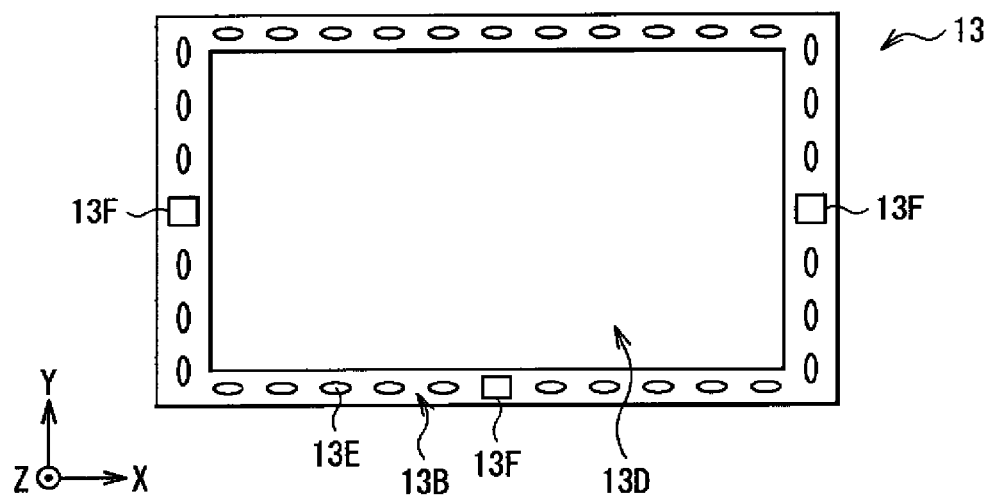
FIG. 26 is a plan view illustrating a modified example of the housing in FIG. 14.
Figure 27:
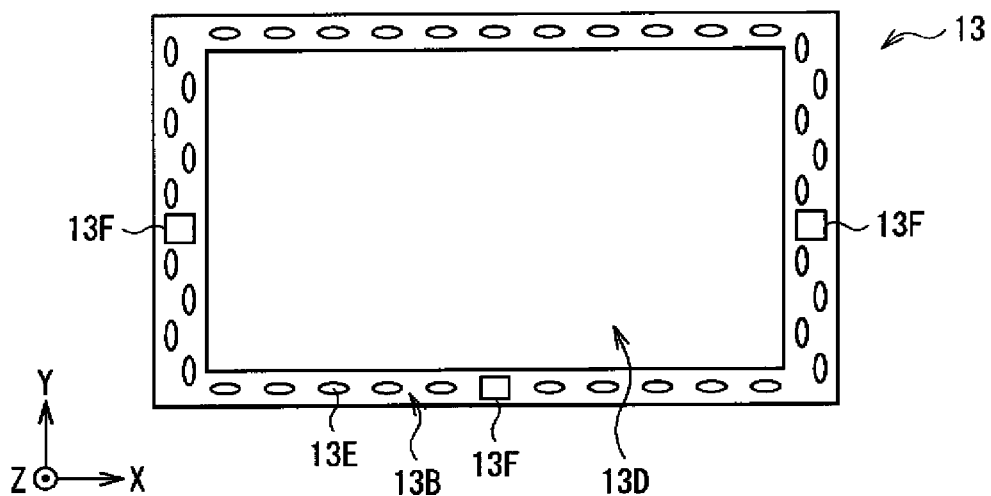
FIG. 27 is a plan view illustrating a modified example of the housing in FIG. 15.
Figure 28:
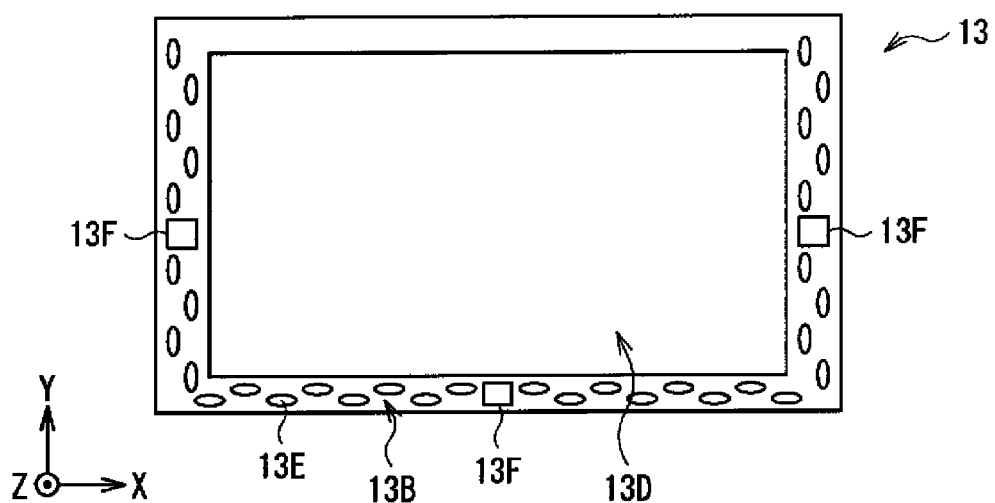
FIG. 28 is a plan view illustrating a modified example of the housing in FIG. 16.
Figure 29:
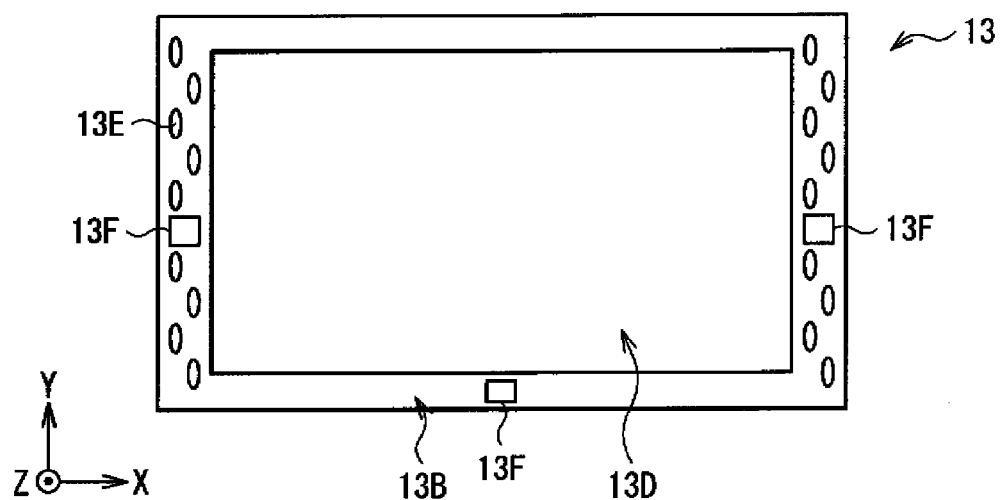
FIG. 29 is a plan view illustrating a modified example of the housing in FIG. 17.
Figure 30:
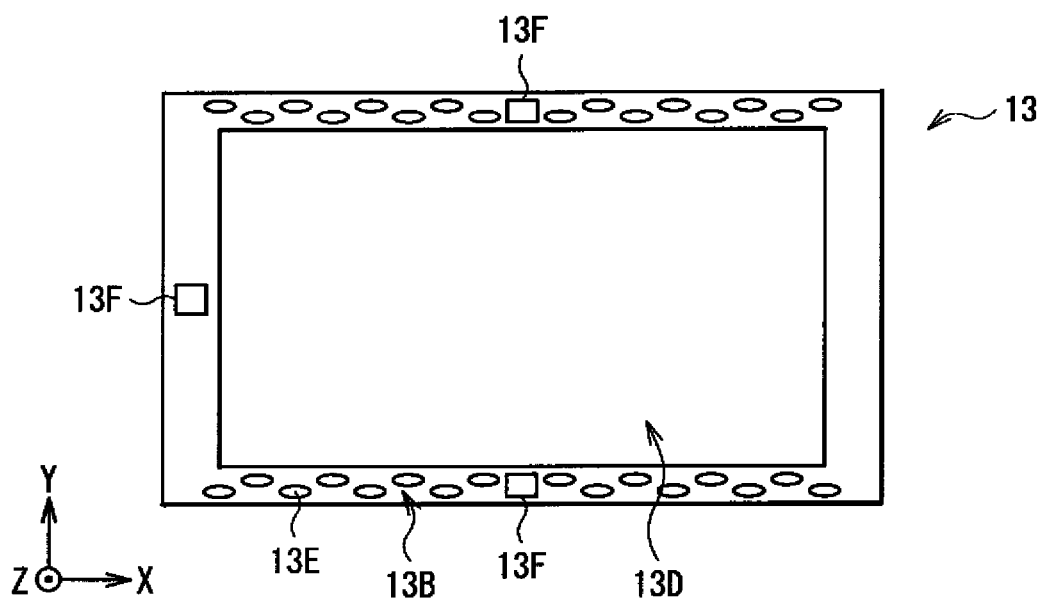
FIG. 30 is a plan view illustrating a modified example of the housing in FIG. 18.

In the embodiment and its modified examples, only projections of a single type (specifically, the projections 13E described above) are provided on the recessed-projected surface of the upper plate 13B. However, projections of another type may further be provided. As shown in e.g. FIGS. 19 to 30, a plurality of projections 13F each having a height equal to that of the projection 13E and a flat surface on an upper surface may further be provided on the recessed-projected surface of the upper plate portion 13B. Incidentally, FIG. 19 illustrates another modified example of the housing 13 depicted in FIG. 4A. FIG. 20 illustrates another modified example of the housing 13 depicted in FIG. 7. FIG. 21 illustrates another modified example of the housing 13 depicted in FIG. 8. FIG. 22 illustrates another modified example of the housing 13 depicted in FIG. 10. FIG. 23 illustrates another modified example of the housing 13 depicted in FIG. 11. FIG. 24 illustrates another modified example of the housing 13 depicted in FIG. 12. FIG. 25 illustrates another modified example of the housing 13 depicted in FIG. 13. FIG. 26 illustrates another modified example of the housing 13 depicted in FIG. 14. FIG. 27 illustrates another modified example of the housing 13 depicted in FIG. 15. FIG. 28 illustrates another modified example of the housing 13 depicted in FIG. 16. FIG. 29 illustrates another modified example of the housing 13 depicted in FIG. 17. FIG. 30 illustrates another modified example of the housing 13 depicted in FIG. 18.

The projections 13F have a role of supporting the liquid crystal panel 20 so as to be parallel to the upper plate portion 13B. If the upper plate portion 13B is formed in a rectangular shape having four sides, therefore, the projections 13F are formed at least three sides among the four sides of the upper plate portion 13B as shown in FIGS. 19 to 30. If the recessed-projected surface of the upper plate portion 13B is formed on two sides of the upper plate portion 13B, as shown in FIGS. 23, 24, 29 and 30, for example, a single projection 13F among the three projections 13F is formed in an area formed with no recessed-projected surface in the upper plate portion 13B. Incidentally, the recessed-projected surface of the upper plate portion 13B may be formed on two sides of the upper plate portion 13B. In such a case, although not illustrated, two projections 13F among the three projections 13F may be formed in an area formed with no recessed-projected surface in the upper plate portion 13B.

The present disclosure has been described thus far taking the embodiment and its modified examples. However, the disclosure is not limited to the embodiment and its modified examples but can be modified in various ways.

Figure 31:
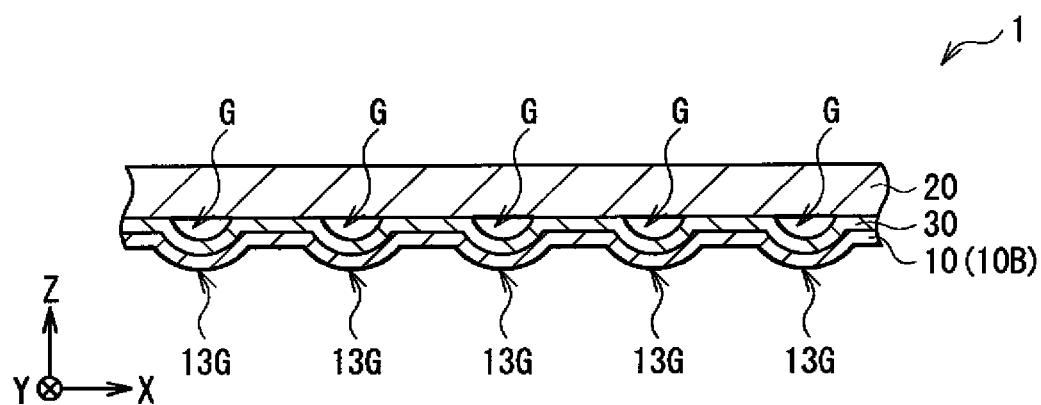
FIG. 31 is a cross-sectional view illustrating a modified example shared by the respective housings according to the above-mentioned embodiment and its modified examples.

In the embodiment and its modified examples, the projections (specifically, the projection 13E and the projection 13F) are provided on the recessed-projected surface of the upper plate portion 13B. However, concave portions 13G may be provided in place of the projections as shown in e.g. FIG. 31.

Also in this case, for example, if the liquid crystal panel 20 is secured to the recessed-projected surface via the adhesive layer 30, gaps G are defined between portions, of the adhesive layer 30, immediately above the recessed portions 13G included in the recessed-projected surface and the liquid crystal panel 20. In this way, while minimizing the force of securing the liquid crystal panel 20 to the housing 13, it can be enabled to locally peel the adhesive layer 30. As a result, when the liquid crystal panel 20 is secured onto the housing 13 via the adhesive layer 30, if the flatness of the housing 13 is non-uniform, the adhesive layer 30 peels at a position where the flatness of the housing 13 is non-uniform, thereby reducing stress occurring in the liquid panel 20. Thus, uneven brightness due to stress can be reduced compared with the case where the liquid crystal panel 20 and the backlight 10 are firmly secured to each other via the adhesive layer 30.

In the embodiment and its modified examples, the display device 1 is shaped in a rectangular parallelepiped; however, it may have a cubic shape. In addition, in the embodiment and its modified examples, the planar shape of the display device 1 is rectangular; however, it may be square or ellipsoidal.

In the embodiment and its modified examples, the display device 1 uses a liquid crystal panel as a display panel for displaying images. However, the display device 1 may use display panels of other types.

The embodiment and its modified examples exemplify the housing 13 made by sheet-metal working; however, the housing 13 may be molded by other methods, e.g., die casting. "The die casting" is a method of pouring melted metal into a precise mold and manufacturing a large number of casts with an excellent surface in a short period of time.

The present disclosure contains subject matter related to that disclosed in Japanese Priority Patent Application JP 2010-244319 filed in the Japan Patent Office on Oct. 29, 2010, the entire content of which is hereby incorporated by reference.

What is claimed is:

1. A display device comprising:
   a display panel;
   an illuminating device adapted to illuminate the display panel from behind; and
   an adhesive layer adapted to be disposed between the display panel and the illuminating device and bond together respective outer edges of the display panel and the illuminating device,
   wherein the illuminating device includes
   a light source, and
   a housing adapted to house the light source,
   the housing including
   a bottom plate portion,
   an annular upper plate portion installed at a position facing the bottom plate portion via a given first gap and having one or more recessed-projected surfaces at a position in contact with the adhesive layer, and
   a wall portion provided upright along respective circumferential edges of the bottom plate portion and the upper plate portion,
   the adhesive layer partially contacting the display panel at the one or more recessed-projected surfaces and configured to form second gaps between the adhesive layer and the display panel.

2. The display device according to claim 1, wherein the one or more recessed-projected surfaces further comprises a plurality of first projections.

3. The display device according to claim 2, wherein the adhesive layer is formed to follow a surface shape of the one or more recessed-projected surfaces, and the display device is provided with the second gaps between a portion, other than immediately above the plurality of first projections, of the adhesive layer and the display panel.

4. The display device according to claim 2, wherein the plurality of first projections are arranged alternately along an extending direction of the upper plate portion.

5. The display device according to claim 2, wherein each of the plurality of first projections has a shape such that the adhesive layer and the display panel are in point-contact with each other at the first projections.

6. The display device according to claim 2, wherein each of the plurality of first projections has a shape such that the adhesive layer and the display panel are in linear contact with each other at the first projections.

7. The display device according to claim 2, wherein the annular upper plate portion is formed in a rectangular shape with four sides, and the one or more recessed-projected surfaces are formed on at least two sides opposite to each other among four sides of the annular upper plate portion.

8. The display device according to claim 7, wherein the annular upper plate portion has second projections on at least three sides among the four sides, the second projections having a height equal to that of the plurality of first projections and a flat surface at an upper surface.

9. A housing for housing a light source and for interfacing with a plate-like member, comprising:
   a bottom plate portion;
   an annular upper plate portion provided at a position facing the bottom plate portion via a first gap and having one or more recessed-projected surfaces;
   a wall portion provided upright along respective circumferential edges of the bottom plate portion and the upper plate portion; and
   an adhesive layer that follows a surface shape of the one or more recessed-projected surfaces such that when contacting the plate-like member second gaps are formed between the
   adhesive layer and the plate-like member.

10. The housing according to claim 9, wherein the one or more recessed-projected surfaces further comprises a plurality of first projections.

11. The housing according to claim 10, wherein the plurality of first projections are arranged alternately along an extending direction of the annular upper plate portion.

12. The housing according to claim 10, wherein each of the first projections has such a shape that the plate-like member and the adhesive layer at the first projections come into point-contact with each other when the plate-like member is put on the front surface of the annular upper plate portion.

13. The housing according to claim 10, wherein each of the first projections has such a shape that the plate-like member and the adhesive layer at the first projections come into linear contact with each other when the plate-like member is put on the front surface of the annular upper plate portion.

14. The housing according to claim 10, wherein the annular upper plate portion is formed in a rectangular shape with four sides, and the recessed-projected surface is formed on at least two sides opposite to each other among four sides.

15. The housing according to claim 14, wherein the annular upper plate portion has second projections on at least three sides among the four sides, the second projections having a height equal to that of the height of the plurality of first projections and a flat surface at an upper surface.

16. An illuminating device comprising:
   a light source; and
   a housing adapted to house the light source,
   wherein the housing comprises:
      a bottom plate portion;
      an annular upper plate portion;
      a first gap between the bottom plate portion and the annular upper plate portion;
      a wall portion between the bottom plate portion and the annular upper plate portion at circumferential edges of the bottom plate portion and the annular upper plate portion;
      a recessed-projected surface formed on an upper surface of the annular upper plate portion;
      an adhesive layer that follows the surface of the recessed-projected surface;
      a display panel adhered to the adhesive layer; and
      second gaps formed between the display panel and adhesive layer at the recessed-projected surface.

17. The illuminating device of claim 16, wherein the wall portion comprises:
   a first wall extending from the bottom plate portion upright along the circumferential edges of the bottom plate portion; and
   a second wall extending from the annular upper plate portion downward and contacting the first wall to connect the annular upper plate portion and the bottom plate portion.

* * * * *